(12) United States Patent
Unnikrishnan et al.

(10) Patent No.: US 10,747,266 B2
(45) Date of Patent: Aug. 18, 2020

(54) DOCKS, COMPUTING DEVICES, METHODS FOR CONTROLLING A DOCK, AND METHODS FOR CONTROLLING A COMPUTING DEVICE

(71) Applicant: RAZER (ASIA-PACIFIC) PTE. LTD., Singapore (SG)

(72) Inventors: Sreenath Unnikrishnan, Singapore (SG); Min-Liang Tan, Singapore (SG); Chee Oei Chan, Singapore (SG); Jian Yao Lien, Singapore (SG); Jeffrey Chee Cheng Liang, Singapore (SG); Greg Breinholt, Singapore (SG); Boon Sim Chong, Singapore (SG); Kah Yong Lee, Singapore (SG); Sze Khiang Rex Kwek, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/087,619

(22) PCT Filed: Mar. 24, 2016

(86) PCT No.: PCT/SG2016/050139
§ 371 (c)(1),
(2) Date: Sep. 21, 2018

(87) PCT Pub. No.: WO2017/164808
PCT Pub. Date: Sep. 28, 2017

(65) Prior Publication Data
US 2019/0101956 A1    Apr. 4, 2019

(51) Int. Cl.
*G06F 1/16*    (2006.01)
*B60K 35/00*    (2006.01)
(Continued)

(52) U.S. Cl.
CPC ............ *G06F 1/1632* (2013.01); *B60K 35/00* (2013.01); *B60K 37/06* (2013.01); *G06F 1/163* (2013.01);
(Continued)

(58) Field of Classification Search
None
See application file for complete search history.

(56) References Cited

U.S. PATENT DOCUMENTS

| 5,889,737 A | 3/1999 | Alameh et al. |
| 6,556,222 B1 | 4/2003 | Narayanaswami |

(Continued)

FOREIGN PATENT DOCUMENTS

| CN | 202686185 U | 1/2013 |
| CN | 203705845 U | 7/2014 |

(Continued)

OTHER PUBLICATIONS

Extended European Search Report dated Feb. 27, 2019, 7 pages, for the corresponding European Patent Application No. 16895643.1.
(Continued)

*Primary Examiner* — Xanthia C Cunningham
(74) *Attorney, Agent, or Firm* — Polsinelli PC (57) ABSTRACT

According to various embodiments, a dock may be provided. The dock may include: a first attachment member configured to attach to an external item; a second attachment member configured to receive a computing device; and a scroll wheel configured to provide user input to the computing device.

20 Claims, 10 Drawing Sheets

(51) Int. Cl.
*B60K 37/06* (2006.01)
*G06F 3/0362* (2013.01)
*G06F 3/023* (2006.01)

(52) U.S. Cl.
CPC ............ *G06F 1/169* (2013.01); *G06F 1/1626* (2013.01); *G06F 1/1684* (2013.01); *G06F 3/023* (2013.01); *G06F 3/0362* (2013.01); *B60K 2370/126* (2019.05); *B60K 2370/1537* (2019.05); *B60K 2370/834* (2019.05)

(56) References Cited

U.S. PATENT DOCUMENTS

| | | | |
|---|---|---|---|
| 7,068,151 B2 | 6/2006 | Giles et al. | |
| 8,177,182 B1 | 5/2012 | Wood et al. | |
| 8,768,286 B2 | 7/2014 | Naboulsi | |
| 2003/0210333 A1* | 11/2003 | Manico | G06F 1/1601 348/220.1 |
| 2007/0050061 A1 | 3/2007 | Klein et al. | |
| 2008/0002340 A1* | 1/2008 | Chatterjee | G06F 1/1632 361/679.1 |
| 2009/0059730 A1 | 3/2009 | Lyons et al. | |
| 2011/0263293 A1* | 10/2011 | Blake | B60K 35/00 455/557 |
| 2013/0257733 A1* | 10/2013 | Moore | G06F 1/1618 345/168 |
| 2014/0139637 A1 | 5/2014 | Mistry et al. | |
| 2014/0313128 A1 | 10/2014 | Golko et al. | |
| 2014/0368475 A1 | 12/2014 | Spahl et al. | |
| 2015/0039877 A1 | 2/2015 | Hall et al. | |
| 2015/0070832 A1* | 3/2015 | Schneider | G06F 1/1632 361/679.41 |
| 2015/0081169 A1 | 3/2015 | Pisz | |
| 2015/0116927 A1* | 4/2015 | Robinson | G06F 1/1632 361/679.43 |
| 2015/0127215 A1 | 5/2015 | Chatterjee | |
| 2015/0351681 A1 | 12/2015 | Lee et al. | |
| 2015/0379866 A1 | 12/2015 | Paek | |
| 2016/0056647 A1 | 2/2016 | Choi | |

FOREIGN PATENT DOCUMENTS

| | | |
|---|---|---|
| CN | 204137095 U | 2/2015 |
| CN | 204705936 U | 10/2015 |
| CN | 205080368 U | 3/2016 |
| GB | 2 379 286 A | 3/2003 |
| JP | H07239387 A | 9/1995 |
| JP | 2000 241199 A | 9/2000 |
| KR | 2010 0098743 A | 9/2010 |
| KR | 2015 0140212 A | 12/2015 |
| WO | WO 2014047695 A2 | 4/2014 |

OTHER PUBLICATIONS

International Search Report and Written Opinion, dated Jul. 28, 2016, for the corresponding International Application No. PCT/SG2015/050456 in 8 pages.
The Oh-Thumb Holder Attaches Your Apple Watch to the Steering Wheel, HypeBeast by Gavin Yeung (http://hypebeast.com/2015/8/apple-watch-steering-wheel-car-mount-oh-thumb) in 1 page dated Aug. 25, 2015.
This Gesture-Controlled Steering Wheel Cover Transforms Any Car Into a Smart Car, Tech Times by Lauren Keating (http://www.techtimes.com/articles/130138/20160202/gesture-controlled-steering-wheel-cover-transforms-car-smart.htm) in 1 page dated Feb. 2, 2016.
Smart Cars Enables with Wearables, Wearable Technologies by My Nguyen (https://www.wearable-technologies.com/2015/11/make-it-wearable-with-smart-car-generation/) in 1 page circa 2015.
Wearables in the Automotive Industry (https://www.wearable-technologies.com/2014/05/wearables-in-the-car/) Wearable Technologies by Florian Schumacher in 2 pages circa 2014.
Office Action (including English Translation) dated Mar. 27, 2020, for the corresponding Chinese Application No. 201680085665.4 in 18 total pages.

* cited by examiner

DOCKS, COMPUTING DEVICES, METHODS FOR CONTROLLING A DOCK, AND METHODS FOR CONTROLLING A COMPUTING DEVICE

TECHNICAL FIELD

Various embodiments generally relate to docks, computing devices, methods for controlling a dock, and methods for controlling a computing device.

BACKGROUND

With the advent of smart watches, users have a device they can carry with them everywhere which can interact with their phone and provide the convenience of not having to remove their phones from their pockets for basic functions. Smart watches that provide the user the option to interact with their cars require the use of smart cars, which are normally more expensive. Additionally, a smart watch cannot (or at least should not) be used while driving, since it requires the user to look away from the road to their watch, potentially causing a safety hazard. Thus, there may be a need for enhanced devices.

SUMMARY OF THE INVENTION

According to various embodiments, a dock may be provided. The dock may include: a first attachment member configured to attach to an external item; a second attachment member configured to receive a computing device; and a scroll wheel configured to provide user input to the computing device.

According to various embodiments, a computing device may be provided. The computing device may include: an attachment member configured to attach to a dock; and an interface configured to receive input from a scroll wheel of the dock.

According to various embodiments, a method for controlling a dock with a first attachment member configured to attach to an external item and a second attachment member configured to receive a computing device may be provided. The method may include controlling a scroll wheel to provide user input to the computing device.

According to various embodiments, a method for controlling a computing device with an attachment member configured to attach to a dock may be provided. The method may include receiving input from a scroll wheel of the dock.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the dock as described in this description may include a memory which is for example used in the processing carried out in the dock. In this context, the computing device as described in this description may include a memory which is for example used in the processing carried out in the computing device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

There may be instances of car manufacturers working with smart watch manufacturers to enable control of some functions on their cars using apps on the smart watch, which may desire the cars to be smart themselves in order for the watch/phone to communicate with it.

It may be best to not use smart watches during driving as they can be a source of distraction during driving. Additionally, a remote controller placed in a position for easy access, such as the steering wheel, which interacts with a smart phone and control a few apps on the phone may be desirable since it also makes it convenient and safer to control the car's entertainment system.

Some docks that help the user have the smart watch accessible easily on the steering wheel may be available. However, these docks do not provide any additional functionality to the watch in terms of easier navigation. In other words, while docks may be available for smart watches to be affixed onto the steering wheel in easy reach of the driver, they do not provide an intuitive way for the user to interact with them, since their navigation involves the use of touch only.

Additionally, purpose built in-car controllers may have the disadvantage of requiring a power source, whether using batteries or being rechargeable. According to various embodiments, a functional dock may be provided which does not need any power source, since it may use the power from the smart watch which has been docked into it, when in use.

According to various embodiments, a way for a user to be able to get another dimension to easier navigation of the smart phone in the car may be provided, for example using the functional dock according to various embodiments, giving easy access to the features that the user might want to access while driving, for example making and receiving calls, music and other media, or GPS (global positioning system) navigation.

According to various embodiments, a way for the user to use a smart watch as a remote controller for the car's entertainment system may be provided.

According to various embodiments, a wearable in-car controller may be provided. According to various embodiments, a functional dock for a smart watch for in-car remote control may be provided.

According to various embodiments, an in-car controller that attaches to a steering wheel of a car and interacts with a smart phone (which may be connected to an entertainment system) that can also be worn on a user's wrist when not driving may give easy access to entertainment without distractions while driving, and may function as a smart watch when not.

According to various embodiments, an in-car holder/dock for receiving a smartwatch may be provided, wherein the holder/dock may be attached to a steering wheel of car. When the smartwatch (which may be detachable from its strap) is received by the holder, this may allow the driver to utilize all the features of the mobile phone and to control the vehicle entertainment system through the smartwatch. The holder may also have a rotatable bezel to provide added ease of control for the driver such as for scrolling and volume control. Another benefit of the holder may be that it is powered by the smartwatch so it doesn't need to be charged separately.

According to various embodiments, a dock with a tactile scroll feature (for example a scroll wheel) that may be attached to a steering wheel of a car and that may interact with a purpose built smart watch module may be provided. The watch/dock combination may in turn be connected to a smartphone, for example using Bluetooth, which in turn may be connected to the car's entertainment system, or may be used on its own.

Various embodiments may enable the user to have a smart watch which can also be used as a controller for in-car entertainment. Various embodiments may enable use of the smartwatch while driving, may ensure minimal distractions while driving, from the watch, while also being a convenient way to control the entertainment system of the car, may negate the need to have a smart car since the watch interacts with the phone, which is in turn connected to a compatible car system which can be bought aftermarket, and may enable the user to have tactile feedback while using the disc with the car's steering wheel dock.

Figure 1A:
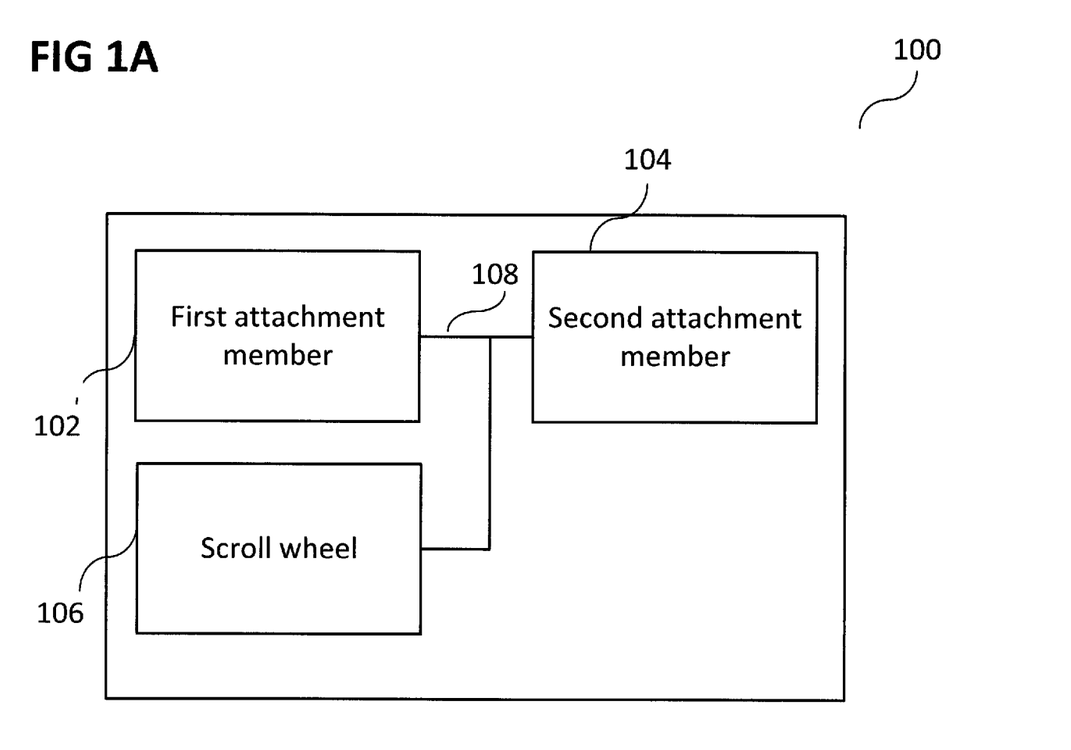
FIG. 1A shows a dock according to various embodiments.

FIG. 1A shows a dock 100 (in other words: a docking station; in other words: a docking device; in other words: a connection device; in other words: a cradle; in other words: a cradle device) according to various embodiments. The dock 100 may include a first attachment member 102 configured to attach to an external item (for example external to the dock; for example to a steering wheel of a car, or to a wrist of a user; not shown in FIG. 1A). The dock 100 may further include a second attachment member 104 configured to receive a computing device (not shown in FIG. 1A, for example a computing device like shown in FIG. 1C or FIG. 1D). The dock 100 may further include a scroll wheel 106 (in other words: a rotatable bezel) configured to provide user input to the computing device, which may for example be provided surrounding a space on which the computing device may be received, for example circumferentially around the dock 100, for example on a rim of the dock 100. The first attachment member 102, the second attachment member 104, and the scroll wheel 106 may be coupled with each other, like indicated by lines 108, for example electrically coupled, for example using a line or a cable, and/or mechanically coupled.

In other words, according to various embodiments, a docking device for receiving a computing device may include a scroll wheel for controlling the computing device.

Figure 1B:
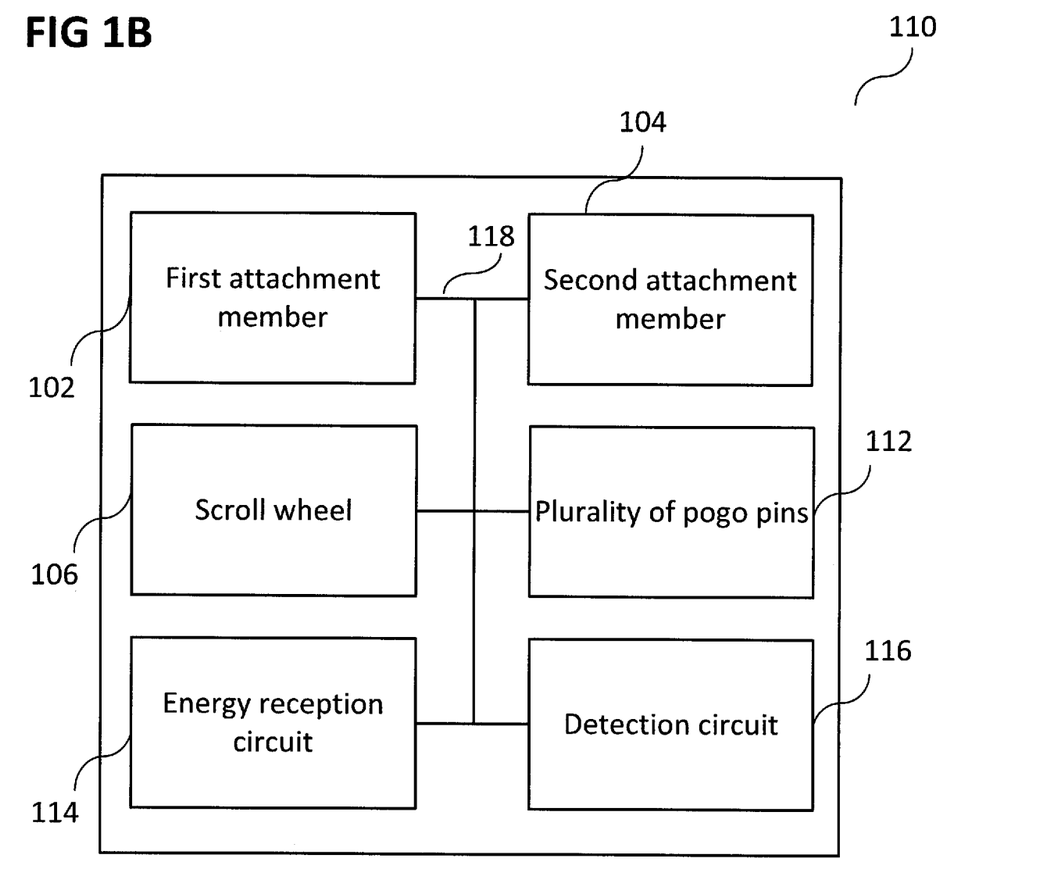
FIG. 1B shows a dock according to various embodiments.

FIG. 1B shows a dock 110 according to various embodiments. The dock 110 may, similar to the dock 100 shown in FIG. 1A, include a first attachment member 102 configured to attach to an external item. The dock 110 may, similar to the dock 100 shown in FIG. 1A, include further include a second attachment member 104 configured to receive a computing device. The dock 110 may, similar to the dock 100 shown in FIG. 1A, include further include a scroll wheel 106 configured to provide user input to the computing device. The dock 110 may further include a plurality of pogo pins 112. The dock 110 may further include an energy reception circuit 114. The dock 110 may further include a detection circuit 116. The first attachment member 102, the second attachment member 104, the scroll wheel 106, the plurality of pogo pins 112, the energy reception circuit 114, and the detection circuit 116 may be coupled with each other, like indicated by lines 118, for example electrically coupled, for example using a line or a cable, and/or mechanically coupled.

According to various embodiments, the plurality of pogo pins 112 (which may be contacts under pre-tension, for example using springs, in other words: spring-loaded pins) may be configured to provide electrical contact to the computing device.

According to various embodiments, the energy reception circuit 114 may be configured to receive energy from the computing device.

According to various embodiments, the detection circuit 116 may be configured to detect whether the computing device is attached to the dock 110.

According to various embodiments, the detection circuit 116 may be configured to instruct the computing device to change from a watch mode (which may be a normal mode of operation of a smart watch) to a car mode (which may be a mode of operation which allows control of the computing device or of a further computing device in (for example wireless) connection with the computing device during use in a car) if detection circuit detects that the computing device is attached to the dock 110.

According to various embodiments, the scroll wheel 106 may include a mechanical scroll wheel.

According to various embodiments, the scroll wheel 106 may be configured to provide a click function.

According to various embodiments, the second attachment member 104 may be configured to receive an at least substantially cylindrically shaped computing device.

Figure 1C:
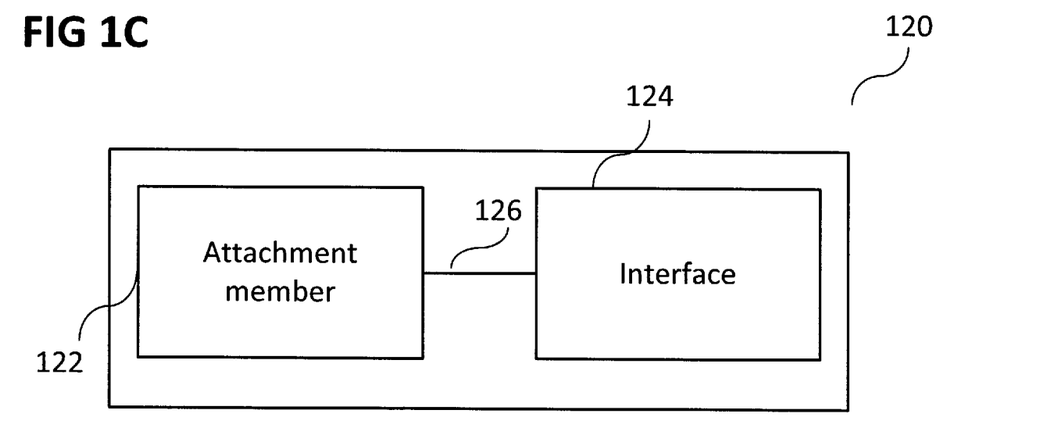
FIG. 1C shows a computing device according to various embodiments.

FIG. 1C shows a computing device 120 according to various embodiments. The computing device 120 may include an attachment member 122 configured to attach to a dock (not shown in FIG. 1C; for example a dock as shown in FIG. 1A or FIG. 1B). The computing device 120 may further include an interface 124 configured to receive input from a scroll wheel of the dock. The attachment member 122 and the interface 124 may be coupled with each other, like indicated by line 126, for example electrically coupled, for example using a line or a cable, and/or mechanically coupled.

Figure 1D:
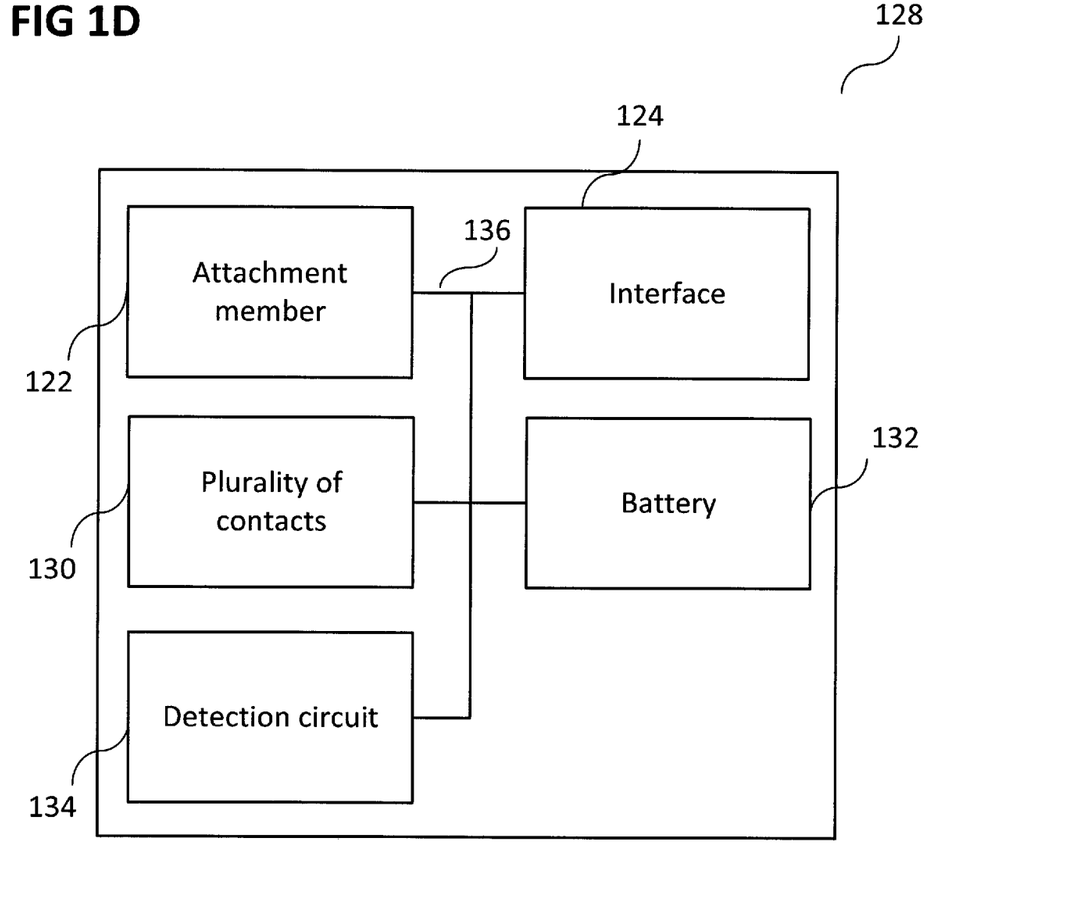
FIG. 1D shows a computing device according to various embodiments.

FIG. 1D shows a computing device 128 according to various embodiments. The computing device 128 may, similar to the computing device 120 shown in FIG. 1C, include an attachment member 122 configured to attach to a dock. The computing device 128 may, similar to the computing device 120 shown in FIG. 1C, further include an interface 124 configured to receive input from a scroll wheel of the dock. The computing device 128 may further include a plurality of contacts 130, like will be described in more detail below. The computing device 128 may further include a battery 132, like will be described in more detail below. The computing device 128 may further include a detection circuit 134, like will be described in more detail below. The attachment member 122, the interface 124, the plurality of contacts 130, the battery 132, and the detection circuit 134 may be coupled with each other, like indicated by lines 136, for example electrically coupled, for example using a line or a cable, and/or mechanically coupled.

According to various embodiments, the plurality of contacts 130 may be configured to provide electrical connection to the dock.

According to various embodiments, the battery 132 may be configured to provide energy to the computing device 128 and to the dock.

According to various embodiments, the detection circuit 134 may be configured to detect whether the computing device 128 is attached to the dock.

According to various embodiments, the detection circuit 134 may be configured to switch the computing device 128 from a watch mode to a car mode if the detection circuit 134 detects that the computing device 128 is attached to the dock.

According to various embodiments, the computing device 128 (or a housing of the computing device 128) may be at least substantially cylindrically shaped.

According to various embodiments, the computing device 128 may include or may be or may be included in at least a portion of a smart watch.

Figure 1E:
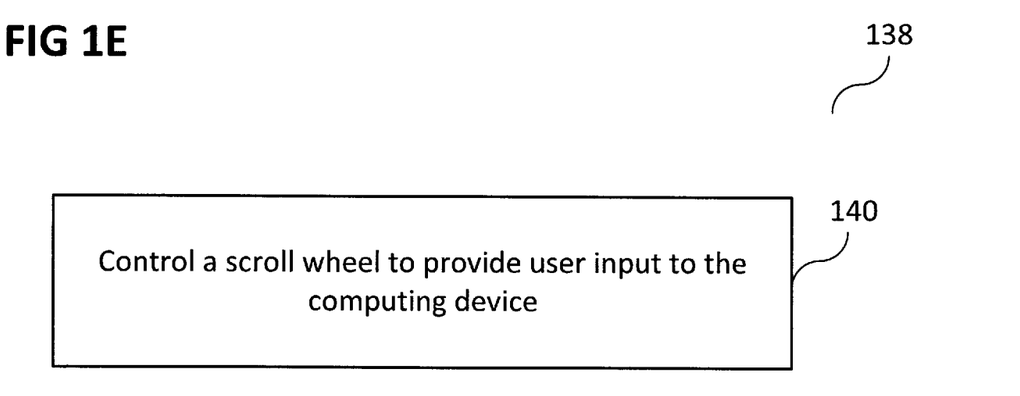
FIG. 1E shows a flow diagram illustrating a method for controlling a dock according to various embodiments.

FIG. 1E shows a flow diagram 138 illustrating a method for controlling a dock according to various embodiments. The dock may have a first attachment member configured to attach to an external item and a second attachment member configured to receive a computing device. In 140, a scroll wheel (of the dock) may be controlled to provide user input to the computing device.

According to various embodiments, the method may further include establishing electrical contact between the dock and the computing device using a plurality of pogo pins of the dock.

According to various embodiments, the method may further include receiving energy in the dock from the computing device.

According to various embodiments, the method may further include detecting whether the computing device is attached to the dock.

According to various embodiments, the method may further include instructing the computing device to change from a watch mode to a car mode if it is detected that the computing device is attached to the dock.

According to various embodiments, the scroll wheel may include or may be or may be included in a mechanical scroll wheel.

According to various embodiments, the scroll wheel may provide a click function.

According to various embodiments, the second attachment member may receive an at least substantially cylindrically shaped computing device.

Figure 1F:
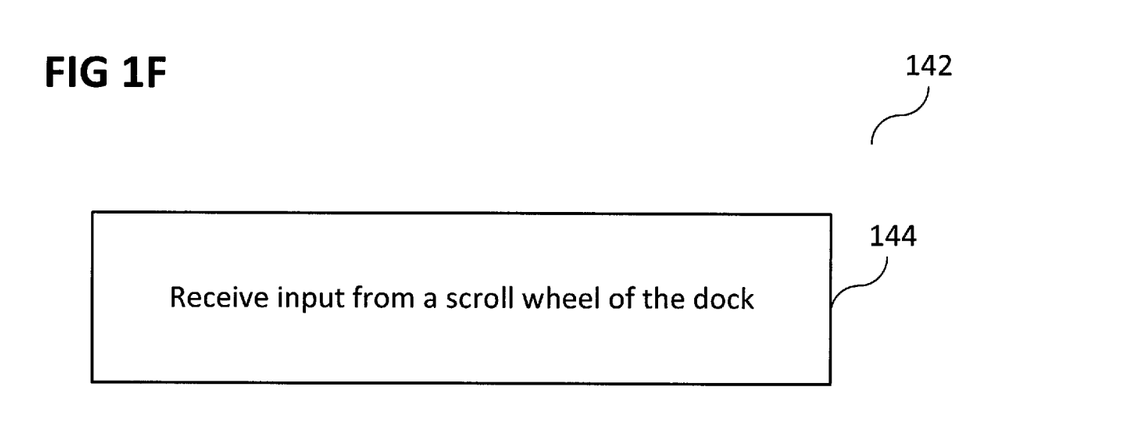
FIG. 1F shows a flow diagram illustrating a method for controlling a computing device according to various embodiments.

FIG. 1F shows a flow diagram 142 illustrating a method for controlling a computing device according to various embodiments. The computing device may include an attachment member configured to attach to a dock. In 144, input from a scroll wheel of the dock may be received.

According to various embodiments, the method may further include establishing electrical connection between the dock and the computing device using a plurality of contacts of the computing device.

According to various embodiments, the method may further include providing energy from a battery of the computing device to the computing device and to the dock.

According to various embodiments, the method may further include detecting whether the computing device is attached to the dock.

According to various embodiments, the method may further include switching the computing device from a watch mode to a car mode if it is detected that the computing device is attached to the dock.

According to various embodiments, the computing device may be at least substantially cylindrically shaped.

According to various embodiments, the computing device may include or may be or may be included in at least a portion of a smart watch.

According to various embodiments, the holder/dock may only function when the smart watch/disc is inserted into the holder/dock. This may change the smart watch mode to an in-car mode which may allow the user to use the rotatable mechanism on the dock for additional functions. The benefit of separating the smart watch and dock may allow the user to access all the functions of a smart watch such as calling, notifications, receiving messages, etc. while on the move.

The smart watch may be a "disc", which may be a disc-shaped electronic device including an OLED (organic light emitting diode) touch screen, a rechargeable battery, an accelerometer, a gyro (in other words: a gyroscope), and other components normally found in smart watches. It may run a version of the Android Wear OS (operating system) or any other OS that smart watches may run on. The disc may be removable/detachable from its strap easily so that it can be affixed to the holder/dock.

According to various embodiments, a strap may be provided on which the removable disc may be securely affixed, enabling the user to wear it on the wrist like a smart watch.

According to various embodiments, a holder for the disc may be provided which may be fixed to the steering wheel of the car, in reach of the user's thumb. This holder may include a rotatable mechanism around the rim which may have a tactile feel and may be used for easy scrolling through the app. The rotatable mechanism may provide the added dimension of easy scrolling or volume control when the smartwatch is connected to the dock. The holder may have pogo pins on the surface which may come into contact with the disc, allowing the disc to detect the scrolling.

According to various embodiments, a separate dock may be provided on which the disc may be placed overnight for charging. When on the dock, the disc may be vertical for aesthetic purposes.

According to various embodiments, an in-car controller dock may be provided which indirectly controls a portable media device by receiving a smart watch which communicates with the media device. This may provide the benefit of the user having all the functions of the smart watch while it is on in-car mode.

According to various embodiments, an in-car controller dock may be provided which does not need to be powered or charged because it is powered by the smart watch. This may provide the benefit of not having to charge another separate device. In other words, in contrast to having separate devices which may cause clutter and inconvenience to the user in terms of having to charge them separately, or having to replace the battery on the in-car controller frequently, according to various embodiments, these issues may be avoided.

According to various embodiments, a wearable (in other words: a wearable device) may provide users all the benefits of a smartwatch, a fitness tracker, a companion for the phone, and may double as a convenient, tactile device for use with a car's entertainment system.

According to various embodiments, the functional dock may be used as an attachment with the user's watch on their wrist (instead of on the steering wheel) for tactile feel.

According to various embodiments, a functional dock may be provided which has a tactile scroll function and which works with another component (for example a smart watch, for example a "disc" of a smart watch). This disc may be detached from the accompanying watch strap for the wrist, and affixed into the functional dock which may in turn be attached to the steering wheel of a car using a strap, clamp or other means.

The dock may have pogo pins which may come into contact with the disc when it is plugged in. This may allow the dock to interact with the smart watch. This may also let the smart phone detect when the disc is plugged into the dock, and may allow it to take appropriate action, like launching a unifying in-car app, entertainment app, navigation, or other similar app relevant to in-car usage by the driver. The dock may draw the required power from the watch for its own functioning.

Figure 2:
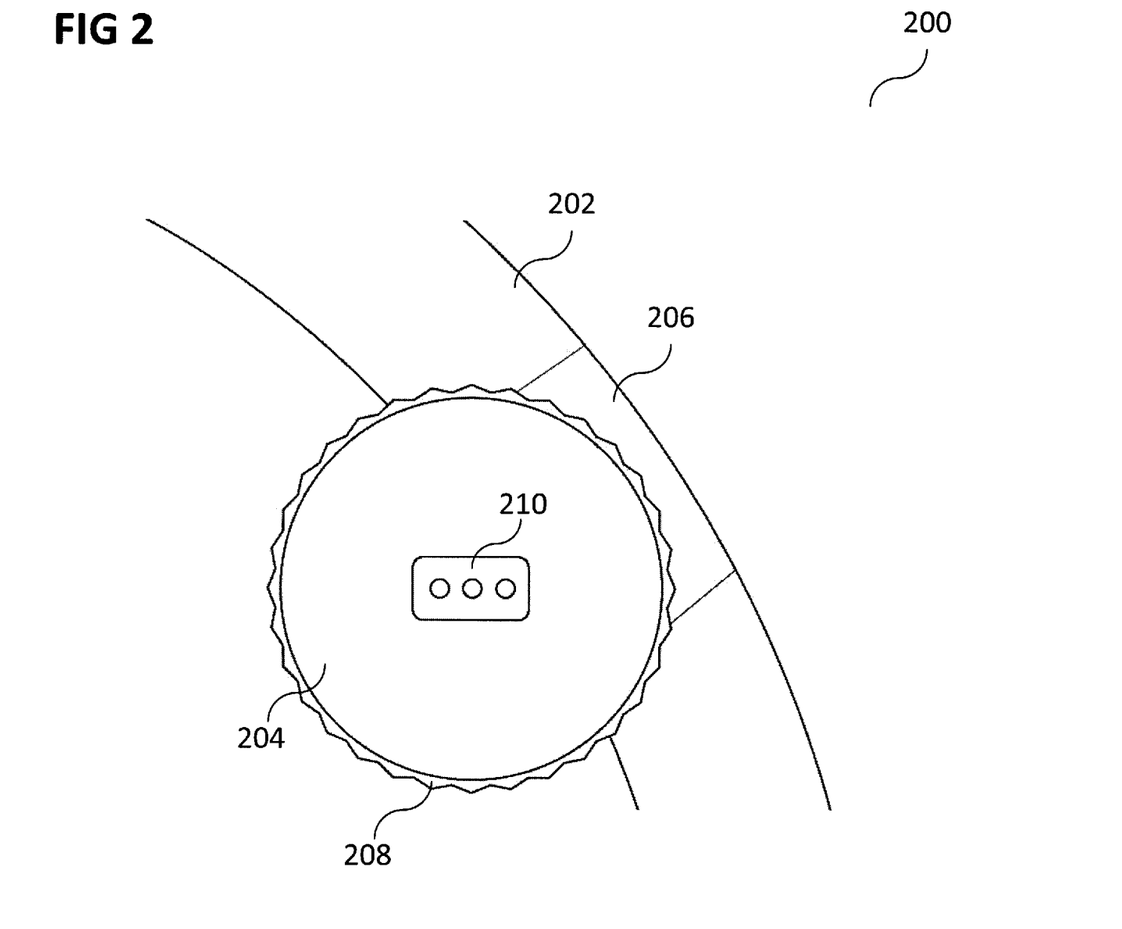
FIG. 2 shows an illustration of a dock according to various embodiments.

FIG. 2 shows an illustration 200 of a dock 204 according to various embodiments, onto which a disc is not affixed. The dock 204 may be attached to a steering wheel 202 of a car using a strap 206 or any other mechanism to keep the dock 204 in place on the steering wheel 202. The dock 204 may include pogo pins 210 to connect with the disc when the disc is place into (or onto) the dock 204. A tactile scroll function may be provided, for example using a scroll wheel 208 around a rim of the dock 204.

Figure 3:
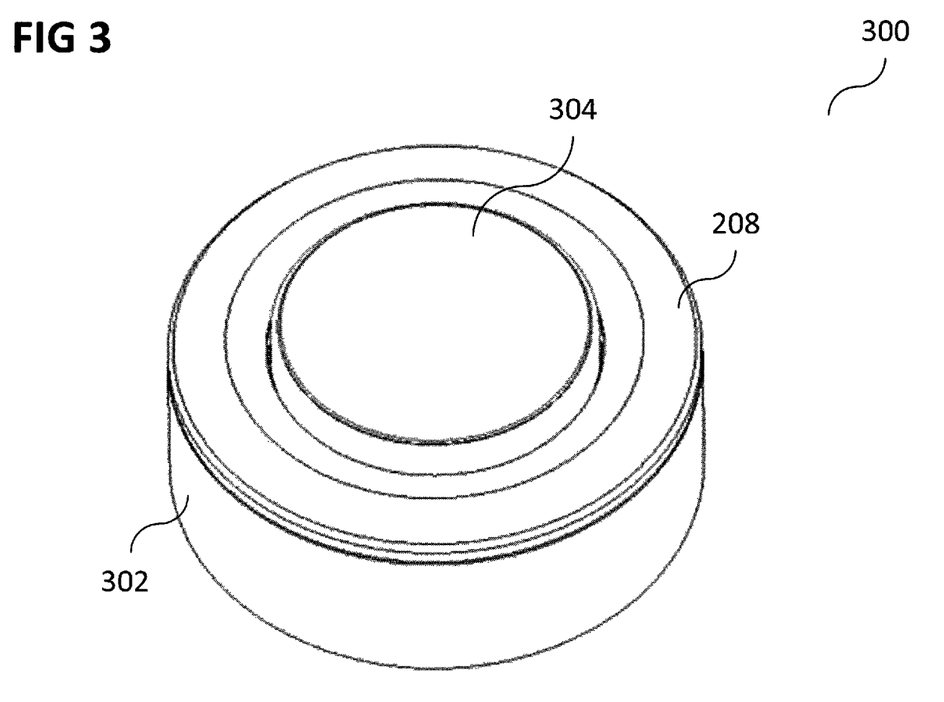
FIG. 3 shows an illustration of a disc in a car dock according to various embodiments.

FIG. 3 shows an illustration 300 of a disc 304 in a car dock according to various embodiments. An enclosure 302 may surround the disc 304 (for example in the form of a watch dial) and the rotating bezel 208.

Figure 4:
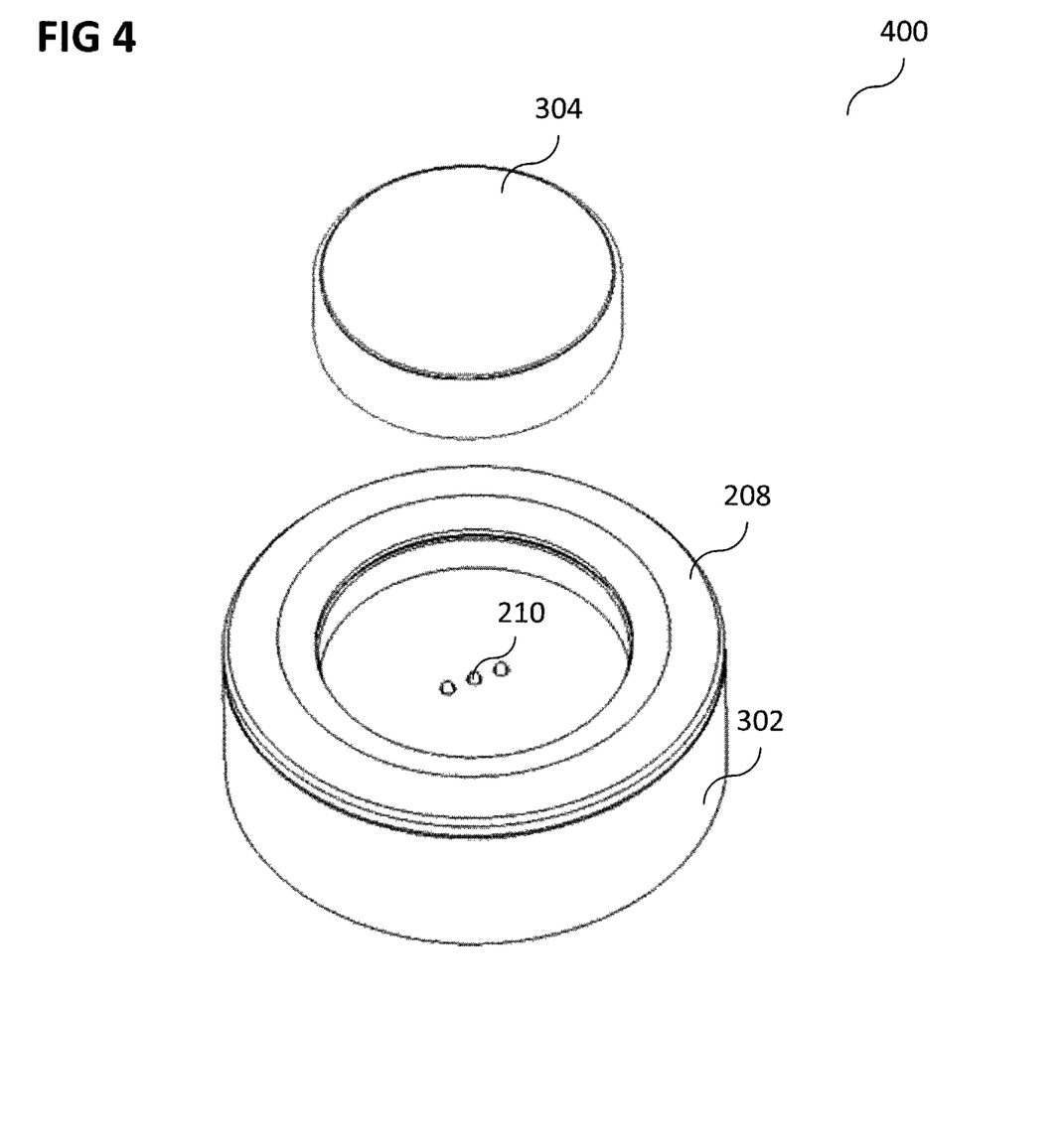
FIG. 4 shows an illustration of an assembly of the disc into the car dock according to various embodiments.

FIG. 4 shows an illustration 400 of an assembly of the disc 304 into the car dock according to various embodiments. The disc 304 may be held by strong magnets in the dock enclosure. The disc 304 may be connected to the dock electrically through 3 pogo-pin contacts 210.

Figure 5:
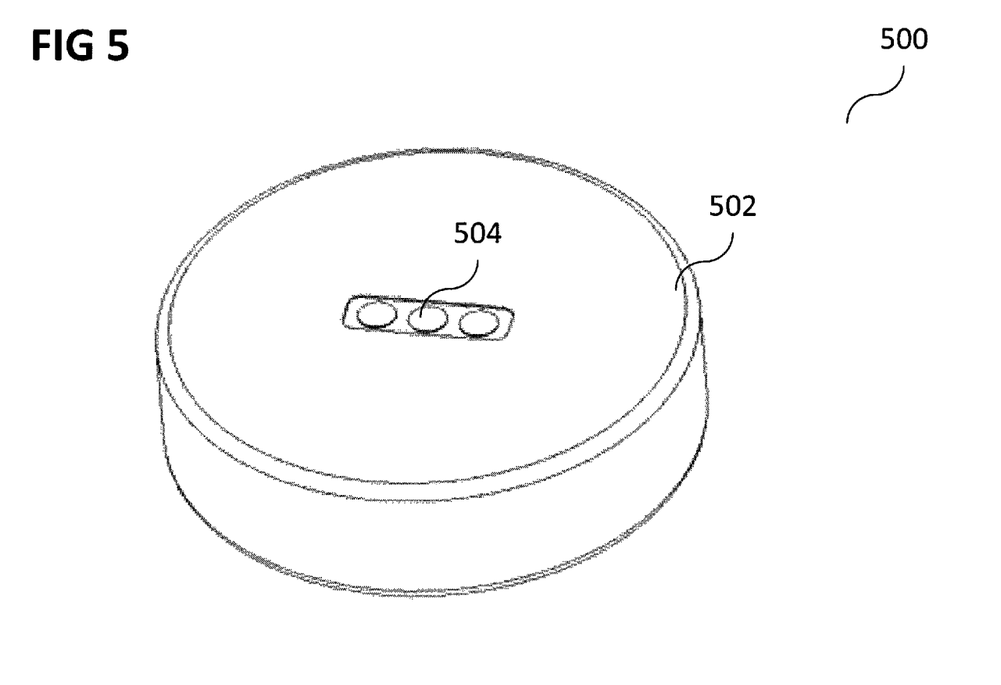
FIG. 5 shows an illustration of the disc base according to various embodiments.

FIG. 5 shows an illustration 500 of the disc base 502, which may be made of stainless steel, according to various embodiments. The disc base 502 may include contacts 504, which may correspond to the pogo pins 208 in the dock.

Figure 6:
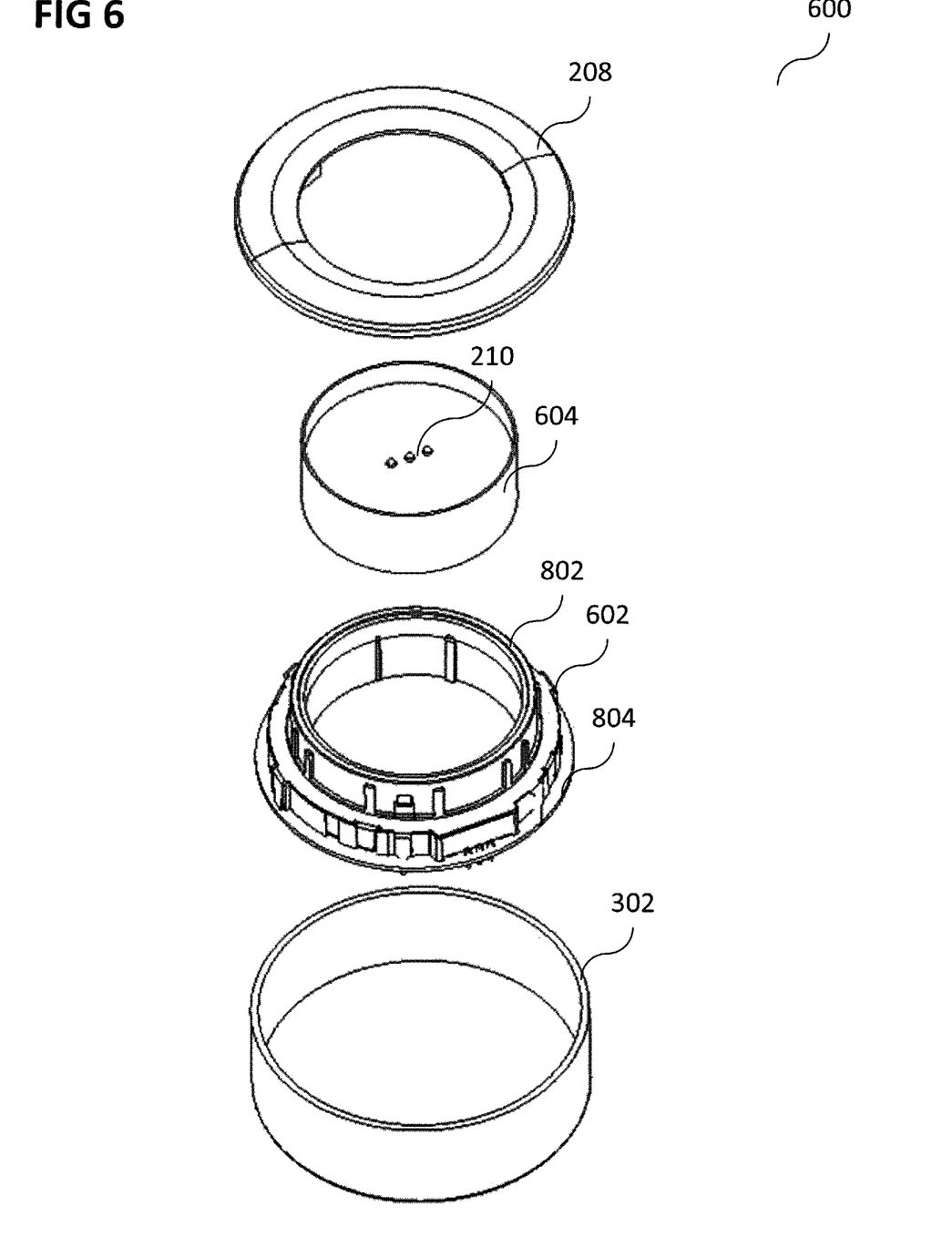
FIG. 6 shows an exploded view of the car dock according to various embodiments.

FIG. 6 shows an exploded view 600 of the car dock according to various embodiments. The external enclosure 302, an electronics module 602 with a PCB 804 (printed circuit board) with a rotary encoder 802, an inner enclosure 604 with the pogo pins 210 and strong magnets (not shown in FIG. 6), and the rotating bezel 208 are shown.

Figure 7:
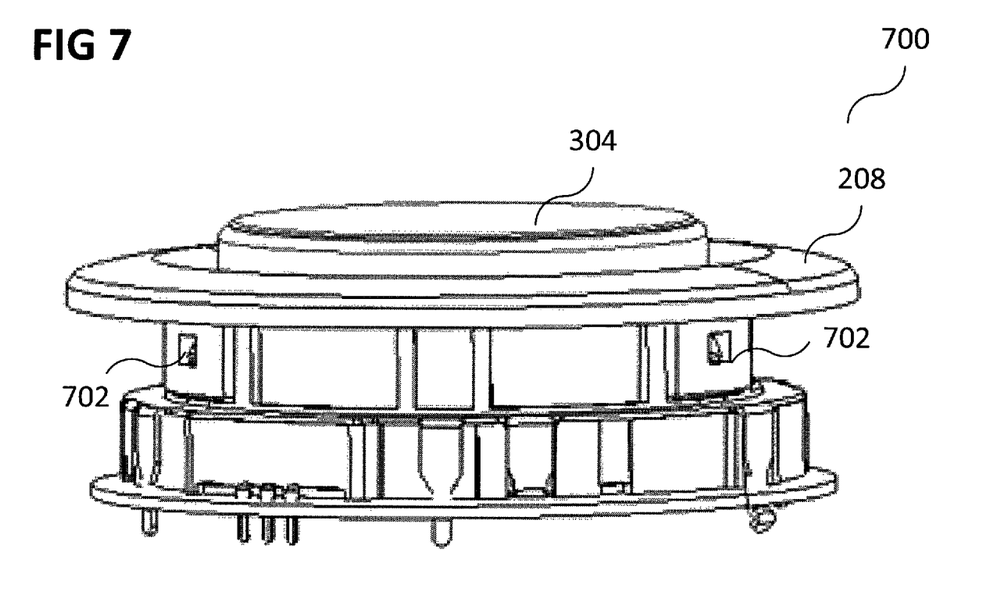
FIG. 7 shows an illustration according to various embodiments, wherein a rotating bezel is attached to a rotary encoder through side snaps.

FIG. 7 shows an illustration 700 according to various embodiments, wherein the rotating bezel 208 is attached to the rotary encoder 802 through side snaps 702.

Figure 8:
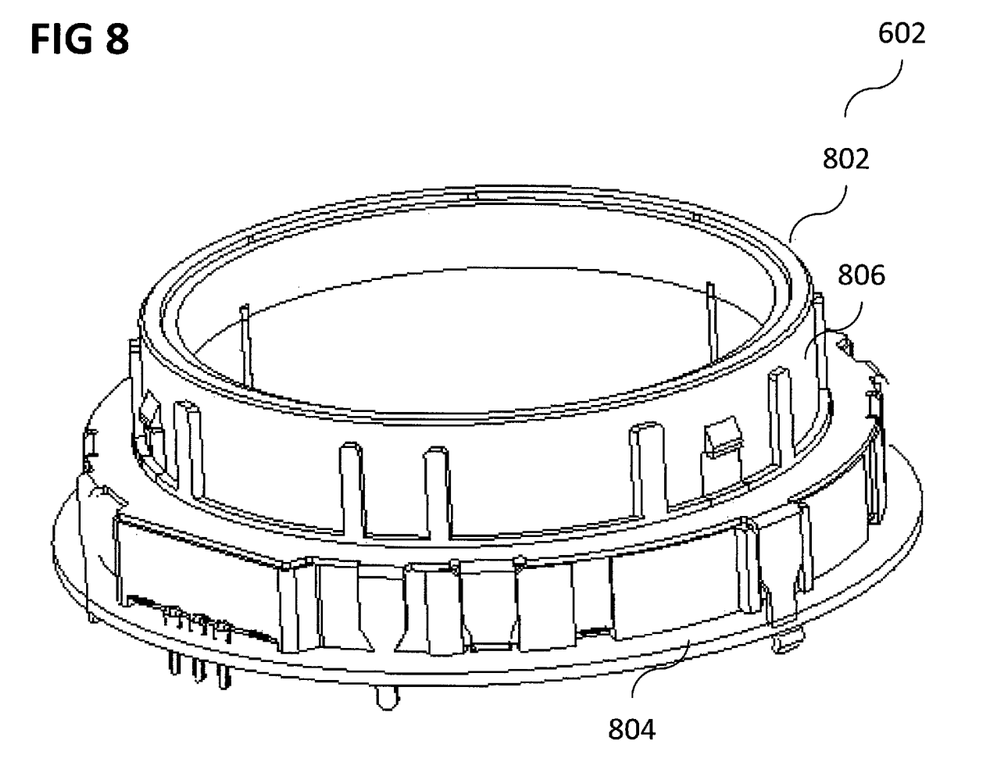
FIG. 8 shows an electronics module according to various embodiments.

FIG. 8 shows the electronics module 602 including the PCB 804 with main circuitry and with a ring-type rotary encoder 802 according to various embodiments. The empty volume within the encoder 802 may make the placement of the disc 304 possible. The ring type rotary encoder 802 may include a rotating (or rotatable) ring 806.

Figure 9:
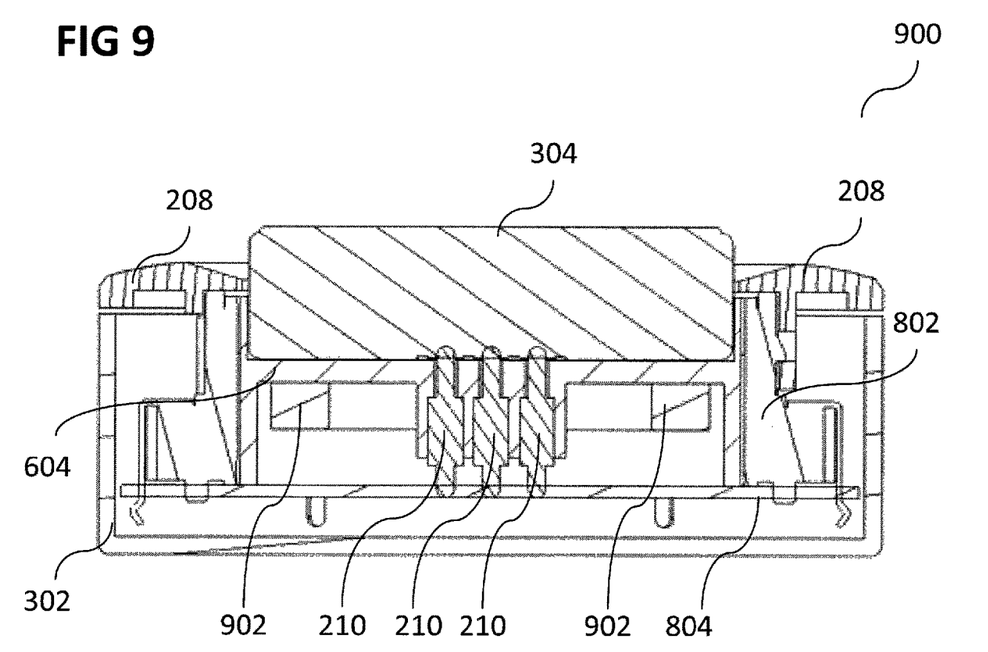
FIG. 9 shows a cross section of a car dock according to various embodiments.

FIG. 9 shows a cross section 900 of the car dock according to various embodiments with the disc 304 assembled (in other words: with the disc 304 provided in (or docked into) the car dock). The disc 304 (for example in the form of a watch dial), the inner enclosure 604, the 3 pogo pins 210 connecting the disc 304 to the PCB 804 (wherein the PCB 804 may include the main circuitry), the external enclosure 302, the rotating bezel 208, and the rotary encoder 802 are shown. A magnet 902 (or a plurality of magnets 902), for example one or more strong magnets) may be provided in the inner enclosure 604 and may hold down the disc 304.

It will be understood that in FIG. 3 to FIG. 9, all elements except the disc 304 are elements of the dock, for example of the car dock.

According to various embodiments, a dock (for example an in-car smartwatch dock like described above) may be provided.

The dock may enable use of the smartwatch in-car, while providing a tactile and mechanical feature to add another dimension of easy navigation through the connected smart phone. The dock may help to ensure lesser distraction while driving, since touch interaction requires the user to look at the screen of the device, unlike a tactile navigation system.

According to various embodiments, the use of the dock's mechanical scroll (in other words: the user of the mechanical scroll wheel) may be customized to match the menu options/function being displayed on the phone. According to various embodiments, if the user is accessing the music feature or is in a call, the scroll wheel may be used as volume control. According to various embodiments, the scroll wheel may be used to zoom in or zoom out of GPS navigation. According to various embodiments, the scroll wheel may be used to scroll between apps in the main menu (for example horizontally or vertically). According to various embodiments, the scroll wheel may be used to browse contacts on the phone. According to various embodiments, the scroll wheel may be used for any other features that benefit from a mechanical scroll function.

Various embodiments may enabling the user to have a tactile scrolling and navigation on a device for easy use in-car, rather than having to rely on the watches' touch screen entirely.

The following examples pertain to further embodiments.

Example 1 is a dock comprising: a first attachment member configured to attach to an external item; a second attachment member configured to receive a computing device; and a scroll wheel configured to provide user input to the computing device.

In example 2, the subject-matter of example 1 can optionally include a plurality of pogo pins configured to provide electrical contact to the computing device.

In example 3, the subject-matter of any one of examples 1 to 2 can optionally include an energy reception circuit configured to receive energy from the computing device.

In example 4, the subject-matter of any one of examples 1 to 3 can optionally include a detection circuit configured to detect whether the computing device is attached to the dock.

In example 5, the subject-matter of example 4 can optionally include that the detection circuit is configured to instruct the computing device to change from a watch mode to a car mode if detection circuit detects that the computing device is attached to the dock.

In example 6, the subject-matter of any one of examples 1 to 5 can optionally include that the scroll wheel comprises a mechanical scroll wheel.

In example 7, the subject-matter of any one of examples 1 to 6 can optionally include that the scroll wheel is configured to provide a click function.

In example 8, the subject-matter of any one of examples 1 to 7 can optionally include that the second attachment member is configured to receive an at least substantially cylindrically shaped computing device.

Example 9 is a computing device comprising: an attachment member configured to attach to a dock; and an interface configured to receive input from a scroll wheel of the dock.

In example 10, the subject-matter of example 9 can optionally include a plurality of contacts configured to provide electrical connection to the dock.

In example 11, the subject-matter of any one of examples 9 to 10 can optionally include a battery configured to provide energy to the computing device and to the dock.

In example 12, the subject-matter of any one of examples 9 to 11 can optionally include a detection circuit configured to detect whether the computing device is attached to the dock.

In example 13, the subject-matter of example 12 can optionally include that the detection circuit is configured to switch the computing device from a watch mode to a car mode if the detection circuit detects that the computing device is attached to the dock.

In example 14, the subject-matter of any one of examples 9 to 13 can optionally include that the computing device is at least substantially cylindrically shaped.

In example 15, the subject-matter of any one of examples 9 to 14 can optionally include that the computing device comprises at least a portion of a smart watch.

Example 16 is a method for controlling a dock with a first attachment member configured to attach to an external item and a second attachment member configured to receive a computing device, the method comprising: controlling a scroll wheel to provide user input to the computing device.

In example 17, the subject-matter of example 16 can optionally include establishing electrical contact between the dock and the computing device using a plurality of pogo pins of the dock.

In example 18, the subject-matter of any one of examples 16 to 17 can optionally include receiving energy in the dock from the computing device.

In example 19, the subject-matter of any one of examples 16 to 18 can optionally include detecting whether the computing device is attached to the dock.

In example 20, the subject-matter of example 19 can optionally include instructing the computing device to change from a watch mode to a car mode if it is detected that the computing device is attached to the dock.

In example 21, the subject-matter of any one of examples 16 to 20 can optionally include that the scroll wheel comprises a mechanical scroll wheel.

In example 22, the subject-matter of any one of examples 16 to 21 can optionally include that the scroll wheel provides a click function.

In example 23, the subject-matter of any one of examples 16 to 22 can optionally include that the second attachment member receives an at least substantially cylindrically shaped computing device.

Example 24 is a method for controlling a computing device with an attachment member configured to attach to a dock, the method comprising: receiving input from a scroll wheel of the dock.

In example 25, the subject-matter of example 24 can optionally include establishing electrical connection between the dock and the computing device using a plurality of contacts of the computing device.

In example 26, the subject-matter of any one of examples 24 to 25 can optionally include providing energy from a battery of the computing device to the computing device and to the dock.

In example 27, the subject-matter of any one of examples 24 to 26 can optionally include detecting whether the computing device is attached to the dock.

In example 28, the subject-matter of any one of examples 24 to 27 can optionally include switching the computing device from a watch mode to a car mode if it is detected that the computing device is attached to the dock.

In example 29, the subject-matter of any one of examples 24 to 28 can optionally include that the computing device is at least substantially cylindrically shaped.

In example 30, the subject-matter of any one of examples 24 to 29 can optionally include that the computing device comprises at least a portion of a smart watch.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A dock for attaching a computing device to a steering wheel, the dock comprising:
   an inner enclosure configured to receive the computing device;
   an external enclosure configured to attach the dock to the steering wheel;
   an electrical contact provided on the inner enclosure, the electrical contact configured to provide electrical contact to the computing device when the computing device is received in the inner enclosure; and
   a scroll wheel surrounding the inner enclosure, the scroll wheel configured to provide user input to the computing device when the computing device is received in the inner enclosure.

2. The dock of claim 1, wherein the electrical contact comprises:
   a plurality of pogo pins.

3. The dock of claim 1, further comprising:
   an energy reception circuit configured to receive energy from the computing device.

4. The dock of claim 1, further comprising:
   a detection circuit configured to detect whether the computing device is attached to the dock.

5. The dock of claim 4,
   wherein the detection circuit is configured to instruct the computing device to change from a watch mode to a car mode if detection circuit detects that the computing device is attached to the dock.

6. The dock of claim 1,
   wherein the scroll wheel comprises a mechanical scroll wheel and is coupled to a rotary encoder.

7. The dock of claim 1,
   wherein the scroll wheel is configured to provide a click function.

8. The dock of claim 1,
   wherein the computing device is cylindrically shaped.

9. A computing device assembly comprising:
   a dock attachable to a steering wheel;
   a computing device detachably coupleable to an inner enclosure of the dock; and
   an electrical interface provided to electrically couple the computing device with the dock,
   wherein the electrical interface is configured to receive input from a scroll wheel of the dock.

10. The computing device assembly of claim 9, further comprising at least one of:
    a battery configured to provide energy to the computing device and to the dock; and
    a detection circuit configured to detect whether the computing device is attached to the dock.

11. The computing device assembly of claim 10,
    wherein the detection circuit is configured to switch the computing device from a watch mode to a car mode if the detection circuit detects that the computing device is attached to the dock.

12. The computing device assembly of claim 9,
    wherein the computing device further comprises an upper surface that is a touch screen and a lower surface having contacts.

13. The computing device assembly of claim 9,
    wherein the computing device is cylindrically shaped and comprises at least a portion of a smart watch.

14. A method for operating a computing device assembly, the method comprising:
    providing a dock that is attachable to a steering wheel;
    wherein the dock comprises:
       an inner enclosure configured to receive computing device;
       an electrical contact provided on the inner enclosure, the electrical contact configured to provide electrical contact to the computing device when the computing device is received in the inner enclosure; and
       a scroll wheel surrounding the inner enclosure, the scroll wheel configured to provide user input to the computing device when the computing device is received in the inner enclosure; and
    controlling the scroll wheel to provide user input to the computing device.

15. The method of claim 14, further comprising at least one of:
    establishing electrical contact between the dock and the computing device using a plurality of pogo pins of the electrical contact; and receiving energy in the dock from the computing device.

16. The method of claim 14, further comprising:
    detecting whether the computing device is attached to the dock.

17. The method of claim 16, further comprising:
    instructing the computing device to change from a watch mode to a car mode if it is detected that the computing device is attached to the dock.

18. The method of claim 14,
    wherein the scroll wheel comprises a mechanical scroll wheel.

19. The method of claim 14,
    wherein the scroll wheel provides a click function.

20. The method of claim 14,
    wherein the computing device is cylindrically shaped and is removable from the dock.

* * * * *